US009137159B2

United States Patent
Zhao et al.

(10) Patent No.: US 9,137,159 B2
(45) Date of Patent: Sep. 15, 2015

(54) RSVP-TE MP2MP SOLUTION

(71) Applicant: Futurewei Technologies, Inc., Plano, TX (US)

(72) Inventors: Qianglin Quintin Zhao, Boxborough, MA (US); Ying Chen, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 221 days.

(21) Appl. No.: 13/850,739

(22) Filed: Mar. 26, 2013

(65) Prior Publication Data

US 2013/0250963 A1    Sep. 26, 2013

Related U.S. Application Data

(60) Provisional application No. 61/615,706, filed on Mar. 26, 2012.

(51) Int. Cl.
| | |
|---|---|
| *H04L 12/801* | (2013.01) |
| *H04L 12/741* | (2013.01) |
| *H04L 12/723* | (2013.01) |
| *H04L 12/761* | (2013.01) |
| *H04L 12/927* | (2013.01) |
| *H04L 12/913* | (2013.01) |

(52) U.S. Cl.
CPC ............... *H04L 45/745* (2013.01); *H04L 45/16* (2013.01); *H04L 45/502* (2013.01); *H04L 45/507* (2013.01); *H04L 47/724* (2013.01); *H04L 47/806* (2013.01)

(58) Field of Classification Search
CPC ....... H04L 47/10; H04L 47/193; H04L 69/16; H04L 69/163; H04L 47/14; H04L 45/50; H04L 45/22; H04L 45/507
See application file for complete search history.

(56) References Cited

U.S. PATENT DOCUMENTS 8,488,616 B2 *  7/2013  Wijnands et al. .......... 370/395.5
2006/0221867 A1  10/2006  Wijnands et al.

FOREIGN PATENT DOCUMENTS

EP    2429135 A1    3/2012

OTHER PUBLICATIONS

Li, R., et al., "Receiver-Driven Multicast Traffic Engineered Label Switched Paths," draft-lzj-mpls-receiver-driven-multicast-rsvp-te-00.txt, Mar. 4, 2012, 25 pages.
Aggarwal, R., et al., "MPLS Upstream Label Assignment for LDP," RFC 6389, Nov. 2011, 14 pages.

(Continued)

*Primary Examiner* — Fan Ng
(74) *Attorney, Agent, or Firm* — Conley Rose, P.C.; Grant Rodolph; William H. Dietrich

(57) ABSTRACT

An apparatus comprising a processor configured to store a first upstream label in a forwarding table upon receipt of a first message encapsulating the first upstream label from a first adjacent node, store a first downstream label in the forwarding table upon receipt of a second message encapsulating the first downstream label from a second adjacent node, send a third message encapsulating a second downstream label to the first adjacent node, send a fourth message encapsulating a second upstream label to the second adjacent node; and forward data received from a plurality of adjacent nodes over a MP2MP LSP using at least a portion of the labels stored in the forwarding table, wherein each adjacent node is associated with only one upstream label and only one downstream label, and wherein the maximum state complexity of the forwarding table is linear relative to the number of adjacent nodes.

12 Claims, 10 Drawing Sheets

(56) References Cited

OTHER PUBLICATIONS

Wijnands, IJ., Ed., et al., "Label Distribution Protocol Extensions for Point-to-Multipoint and Multipoint-to-Multipoint Label Switched Paths," RFC 6388, Nov. 2011, 40 pages.

Aggarwal, Ed., R., "Extensions to Resource Reservation Protocol—Traffic Engineering (RSVP-TE) for Point-to-Multipoint TE Label Switched Paths (LSPs)" RFC 4875, May 2007, 53 pages.

Foreign Communications From a Counterpart Application, PCT Application PCT/US2013/033851, International Search Report dated May 23, 2013, 5 pages.

Foreign Communications From a Counterpart Application, PCT Application PCT/US2013/033851, Written Opinion dated May 23, 2013, 8 pages.

* cited by examiner

Signaling for MP2MP LSP Setup

RSVP-TE MP2MP SOLUTION

CROSS-REFERENCE TO RELATED APPLICATIONS

This application claims priority to U.S. Provisional Application No. 61/615,706, filed Mar. 26, 2012, by Qianglin Quintin Zhao, et al., titled "RSVP-TE MP2MP Solution," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Multiprotocol Label Switching (MPLS) Label Distribution Protocol (LDP) can be used to set up Point-to-Multipoint (P2MP) and Multipoint-to-Multipoint (MP2MP) Label Switched Paths (LSPs). The set of LDP extensions for setting up P2MP or MP2MP LSPs may be referred to as multipoint LDP (mLDP), which is specified in Internet Engineering Task Force (IETF) Request for Comments (RFC) 6388, titled "Label Distribution Protocol Extensions for Point-to-Multipoint and Multipoint-to-Multipoint Label Switched Paths," which is hereby incorporated by reference. Certain Upstream Label Assignment (ULA) techniques are specified in IETF RFC 6389, titled "MPLS Upstream Label Assignment for LDP," which is hereby incorporated by reference. Resource Reservation Protocol-Traffic Engineering (RSVP-TE) extensions for setting up Traffic Engineered (TE) point-to-multipoint (P2MP) Label Switched Paths (LSPs) in Multi-Protocol Label Switching (MPLS) and Generalized MPLS (GMPLS) networks may be specified in IETF RFC 4875, titled "Resource Reservation Protocol-Traffic Engineering (RSVP-TE) for Point-to-Multipoint TE Label Switched Paths (LSPs)," which is hereby incorporated by reference.

MPLS multicast is a growing portion of the Internet Protocol (IP) based multicast solutions in the service providers' networks. This is especially so in the area of multicast Virtual Private Networks (VPNs). An RSVP-TE MP2MP solution may be desirable, as it may have the advantages of the simple and fast protection, traffic engineering, and/or the ability to guarantee bandwidth. Current solutions, however, may not be scalable.

SUMMARY

In one aspect, the disclosure includes an apparatus comprising a processor configured to store a first upstream label in a forwarding table upon receipt of a first message encapsulating the first upstream label from a first adjacent node, store a first downstream label in the forwarding table upon receipt of a second message encapsulating the first downstream label from a second adjacent node, send a third message encapsulating a second downstream label to the first adjacent node, send a fourth message encapsulating a second upstream label to the second adjacent node; and forward data received from a plurality of adjacent nodes over a MP2MP LSP using at least a portion of the labels stored in the forwarding table, wherein each adjacent node is associated with only one upstream label and only one downstream label, and wherein the maximum state complexity of the forwarding table is linear relative to the number of adjacent nodes.

In another aspect, the disclosure includes a method for forwarding traffic over a RSVP-TE MP2MP tunnel, comprising receive, at a first interface of a node, a first message having a first upstream label, wherein the first upstream label identifies the upstream sender in a MP2MP LSP, store the first upstream label in a forwarding table, send, at a second interface of the node, a second message having a second upstream label to a downstream node, wherein the second upstream label identifies the node as an upstream node of the MP2MP LSP, receive, at the second interface of the node, a third message having a first downstream label from the downstream node, wherein the downstream label identifies the downstream node as a downstream root node of the MP2MP LSP, store the first downstream label in the forwarding table, send, at the first interface of the node, a fourth message having a second downstream label to the upstream sender, wherein the second downstream label identifies the node as a downstream node of the MP2MP LSP, wherein the maximum state complexity of the forwarding table is linear with respect to any number of adjacent nodes.

In another aspect, the disclosure includes a computer program product comprising computer executable instructions stored on a non-transitory medium that when executed by a processor cause the processor to perform the following: receive, at a first interface of a node, a first message having a first upstream label, wherein the first upstream label identifies the upstream sender in a MP2MP LSP, store the first upstream label in a forwarding table, send, at a second interface of the node, a second message having a second upstream label to a downstream node, wherein the second upstream label identifies the node as an upstream node of the MP2MP LSP, receive, at the second interface of the node, a third message having a first downstream label from the downstream node, wherein the downstream label identifies the downstream node as a downstream root node of the MP2MP LSP, store the first downstream label in the forwarding table, send, at the first interface of the node, a fourth message having a second downstream label to the upstream sender, wherein the second downstream label identifies the node as a downstream node of the MP2MP LSP, wherein the maximum state complexity of the forwarding table cannot exceed O(n) for any n number of adjacent nodes.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
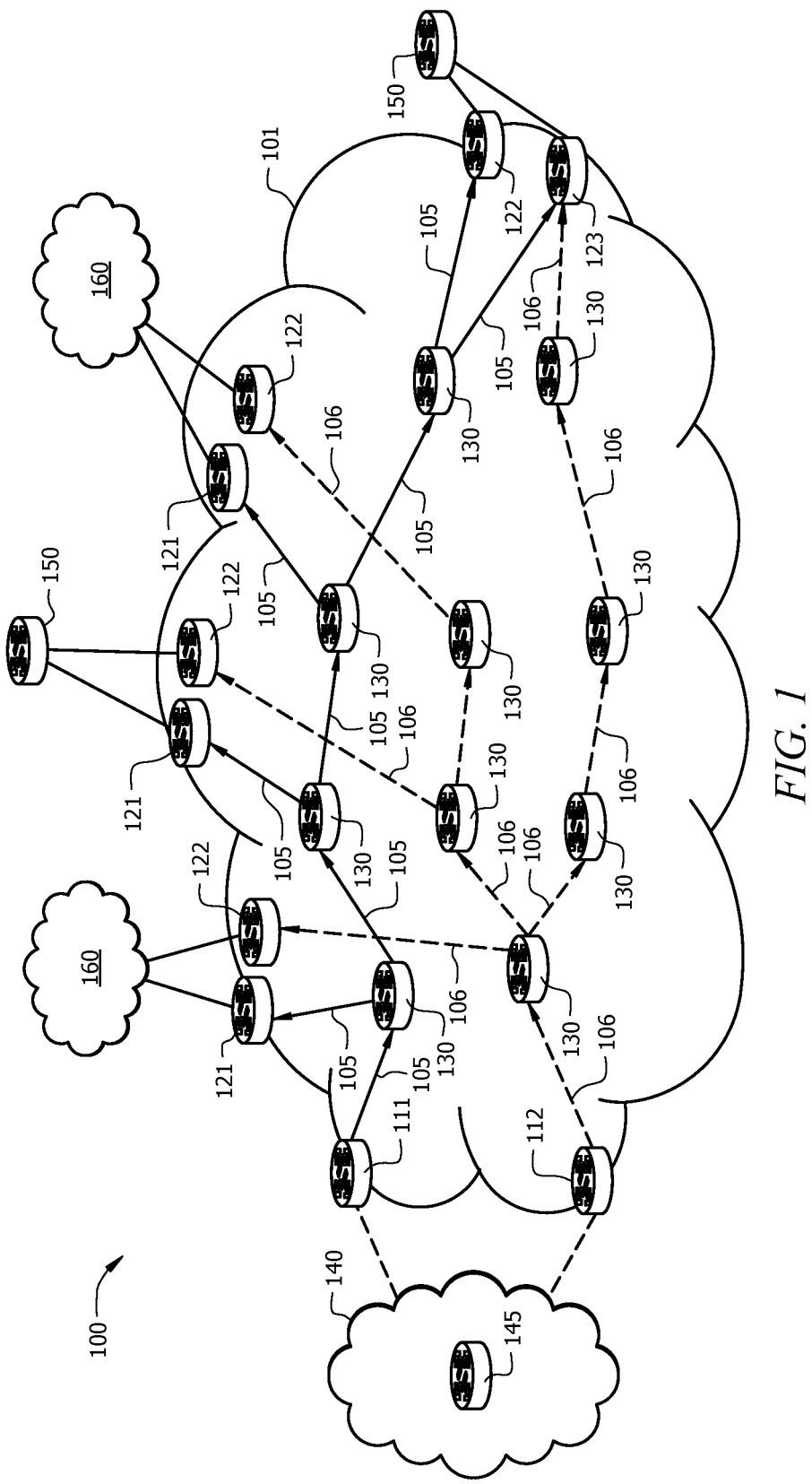
FIG. 1 is a schematic diagram of one example embodiment of a label switched system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The disclosure includes methods and systems to establish MP2MP LSPs using upstream and downstream labels carried by PATH and/or RESV messages. One embodiment comprises embedding and sending upstream labels on PATH messages and downstream labels on RESV messages. A second embodiment comprises sending conventional PATH messages and embedding and sending upstream and downstream labels on RESV messages. A third embodiment comprises sending two sets of PATH and RESV messages, wherein the PATH messages are conventional PATH messages and the RESV messages have embedded upstream or downstream labels. Utilizing the disclosed systems and methods, the path state complexity of the collective solutions may be n, e.g., Landau's symbol describing the path state complexity growth rate may be $O(n)$, where n is the number of nodes, in contrast to conventional solutions identifying MP2MP LSPs by constituent LSPs, which may yield a path state complexity of $n^2$, e.g., $O(n^2)$ path states.

Resource Reservation Protocol (RSVP) is a Transport Layer protocol designed to reserve resources across a network for an integrated services Internet. RSVP may operate over an IP version 4 (IPv4) or IP version 6 (IPv6) Internet Layer and may provide receiver-initiated setup of resource reservations for multicast or unicast data flows. RSVP may establish Quality of Service (QOS)-enabled connections through the use of PATH and RESV messages. A PATH message may include the IP address of the previous node, as well as other data objects, e.g., a sender template, a sender tspec, an adspec, etc., as is well known in the art. A RESV message may include the flowspec data object that identifies the resources that the flow requires, as is well known in the art. When a QOS-enabled connection is established and RSVP signaling is triggered, the sender and receiver(s) may play specific roles in the establishment of an RSVP session; namely, the sender may emit PATH messages toward the receiver(s), and the receiver(s) may issues an RESV message when the PATH message corresponding to the flow arrives. When a PATH message is received, the RSVP service provider (SP), e.g., a router, node, switch, server, etc., may create an RSVP session and may associate a PATH state with the RSVP session. The RSVP SP may send RESV messages once it determines that the PATH state exists for a session that matches a socket for which receiving QOS is indicated. When a RESV message is received, the receiver(s) may reserve the requested parameters, forward the request upstream, e.g., in the direction of the sender, and store and police the nature of the flow.

A P2MP LSP allows traffic from a single ingress (root) node to be delivered to multiple egress (leaf) nodes. A MP2MP LSP allows traffic from multiple ingress (root) nodes to be delivered to multiple egress (leaf) nodes. At any point, a single copy of packet may be sent to any LSP without any multicast routing protocol in the network. MP2MP LSPs may have a single "shared" root just like P2MP LSP, but traffic may flow upstream to the root and downstream from the root. The shared root may be an edge node or an interior node. In conventional MP2MP solutions, every leaf node may send traffic to every other leaf mode using an upstream LSP toward the root and a downstream P2MP LSP to other leaves. This is contrary to P2MP LSPs, where only root is sending traffic downstream. Consequently, conventional signaling for MP2MP LSPs may involve building P2MP LSPs for the shared root and upstream MP2MP LSPs from every leaf mode toward the same root. In conventional solutions, each MP2MP LSP comprises an individual label.

FIG. 1 is a schematic diagram of one example embodiment of a label switched system 100, where a plurality of Point to Point (P2P) LSPs and P2MP LSPs may be established between at least some of the components. The P2P LSPs and P2MP LSPs may be used to transport data traffic, e.g., using packets and packet labels for routing. The label switched system 100 may comprise a label switched network 101, which may be a packet switched network that transports data traffic using packets or frames along network paths or routes. The packets may route or switch along the paths, which may be established using a label switching protocol, such as MPLS or GMPLS.

The label switched network 101 may comprise a plurality of edge nodes, including a first ingress node 111, a second ingress node 112, a plurality of first egress nodes 121, and a plurality of second egress nodes 122. When a P2MP LSP in the label switched network 101 comprises at least some of the edge nodes, the first ingress node 111 and second ingress node 112 may be referred to as root nodes, and the first egress nodes 121 and second egress nodes 122 may be referred to as leaf nodes. Additionally, the label switched network 101 may comprise a plurality of internal nodes 130, which may communicate with one another and with the edge nodes. The first ingress node 111 and the second ingress node 112 may communicate with a source node 145 at a first external network 140, such as an IP network, which may be coupled to the label switched network 101. As such, the first ingress node 111 and the second ingress node 112 may transport data, e.g., data packets, between the label switch network 101 and the external network 140. Further, some of the first egress nodes 121 and second egress nodes 122 may be grouped in pairs, where each pair may be coupled to a second external network or a client.

In an example embodiment, the edge nodes and internal nodes 130 may be any devices or components that support transportation of the packets through the label switched network 101. For example, the network nodes may include switches, routers, servers, or various combinations of such devices. The network nodes may receive packets from other network nodes, determine which network nodes to send the packets to, and transmit the packets to the other network nodes. In some embodiments, at least some of the network nodes may be Label Switch Routers (LSRs), which may be configured to modify or update the labels of the packets transported in the label switched network 101. Further, at least some of the edge nodes may be label edge routers (LERs), which may be configured to insert or remove the labels of the packets transported between the label switched network 101 and the external network 140.

The label switched network 101 may comprise a first P2MP LSP 105, which may be established to multicast data traffic from the first external network 140 to the destination nodes 150 or other networks 160. The first P2MP LSP 105 may comprise the first ingress node 111 and at least some of the first egress nodes 121. The first P2MP LSP 105 is shown using solid arrow arrows in FIG. 1. To protect the first P2MP LSP 105 against link or node failures, the label switched network 101 may comprise a second P2MP LSP 106, which may comprise the second ingress node 112 and at least some of the second egress nodes 122. The second P2MP LSP 106 is shown using dashed arrow arrows in FIG. 1. Each second egress node 122 may be paired with a first egress node 121 of the first P2MP LSP 105. The second P2MP LSP 106 may also comprise some of the same or completely different internal nodes 130. The second P2MP LSP 106 may provide a backup path to the first P2MP LSP 105 and may be used to forward traffic from the first external network 140 to the first P2MP LSP 105 or second P2MP LSP 106, e.g., to egress node 123, when a network component of P2MP LSP 105 fails.

Figure 2A:
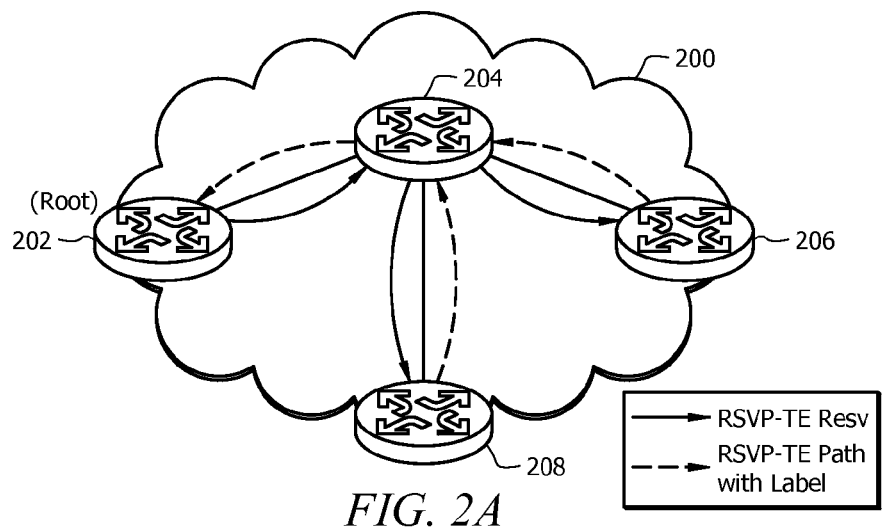
FIG. 2A is a schematic diagram of a MP2MP LSP utilizing an existing P2MP RSVP-TE solution for MP2MP applications for a first root node.
Figure 2B:
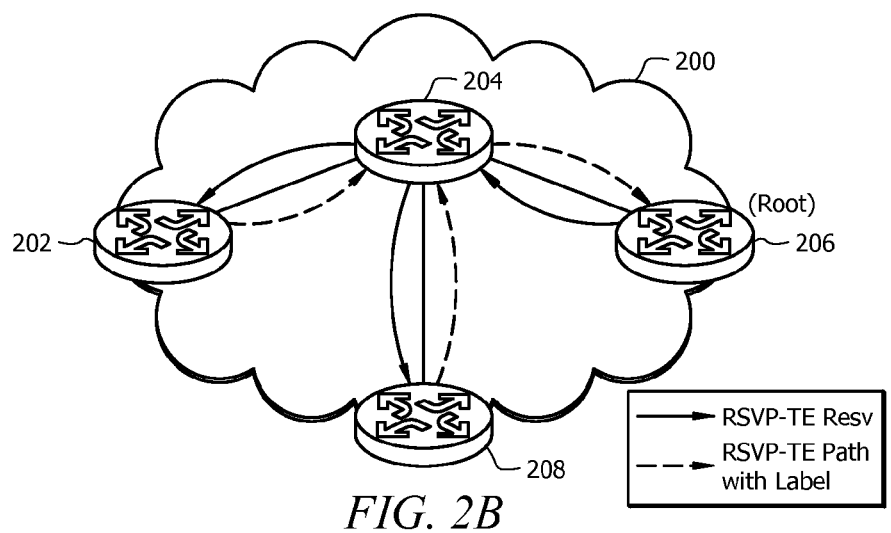
FIG. 2B is a schematic diagram of a MP2MP LSP utilizing an existing P2MP RSVP-TE solution for MP2MP applications for a second root node.
Figure 2C:
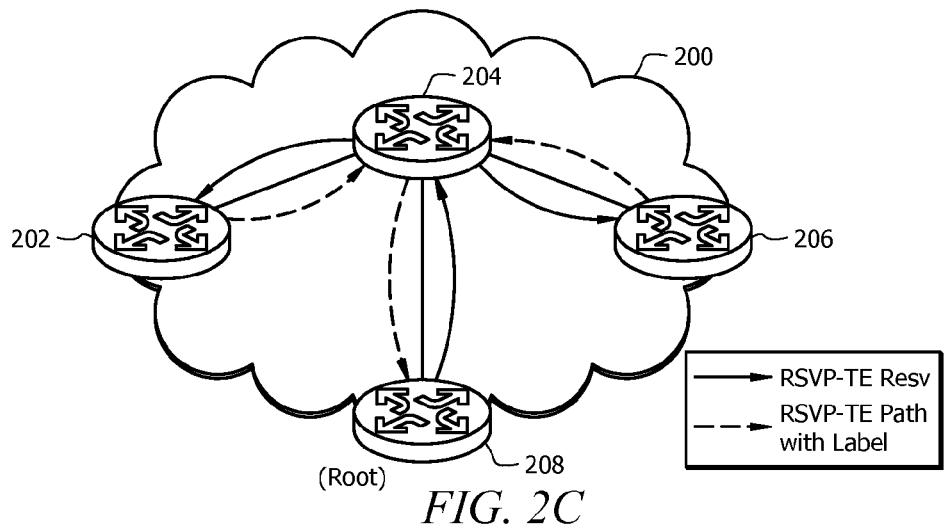
FIG. 2C is a schematic diagram of a MP2MP LSP utilizing an existing P2MP RSVP-TE solution for MP2MP applications for a third root node.

FIGS. 2A, 2B, and 2C are schematic diagrams of a network 200, e.g., label switched network 101 of FIG. 1, showing problems with conventional P2MP RSVP-TE solutions for MP2MP applications, e.g., as described in RFC 4875, for a first, second, and third root node. FIGS. 2A, 2B, and 2C may include nodes 202-208, e.g., nodes 111, 112, 121, 122, 123, 130, and/or 140 of FIG. 1, connected in the manner shown. In FIG. 2A, node 202 is the root, while nodes 204-208 are downstream nodes. In FIG. 2B, node 206 is the root, while nodes 202, 204, and 208 are downstream nodes. In FIG. 2C, node 208 is the root, while nodes 202-206 are downstream nodes. FIGS. 2A, 2B, and 2C show solid and dashed arrows representing message transmissions sent and received during LSP establishment, e.g., LSP 105 of FIG. 1. The solid arrows show the RSVP-TE PATH messages. RSVP-TE PATH messages may be sent from the root node along the data path and may store the path state associated with the LSP in each node along the path, e.g., node 204. The dashed arrows show the RSVP-TE RESV message paths, which may encapsulate LSP labels. An RSVP-TE RESV message may be sent over an LSP from the receiver to the sender host along the reverse data path. At the completion of the RSVP-TE solution, the network 200 may establish a plurality of MP2MP bi-directional LSP tunnels. Each of these MP2MP bi-directional tunnels or their labels may be stored and/or populated in a forwarding table at each node, e.g., node 204, with each direction associated with separate LSPs. However, the complexity of the collective solution shown in FIGS. 2A, 2B, and 2C may be n², e.g., $O(n^2)$ path states, where n is the number of nodes.

Figure 3:
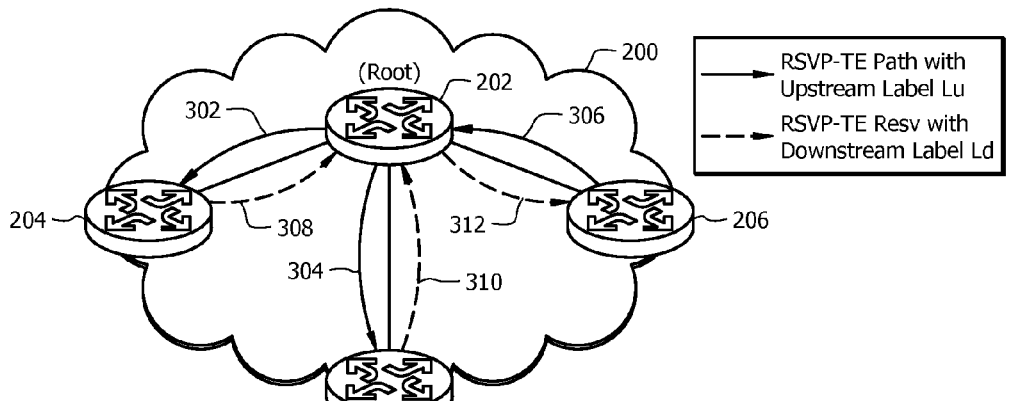
FIG. 3 is a schematic diagram of an embodiment of a MP2MP RSVP-TE solution.

FIG. 3 is a schematic diagram of an embodiment of a MP2MP RSVP-TE solution. FIG. 3 shows the message transmissions necessary to establish the MP2MP RSVP-TE LSP in network 200 under a first embodiment. The solid arrow 302 shows the RSVP-TE PATH message transmissions, wherein the PATH message carries embedded upstream label ($L_{u1}$), which may indicate the LSP from node 202 to node 204. The PATH message may further specify the bandwidth reservation information needed for upstream traffic. The solid arrow 304 shows the RSVP-TE PATH message transmissions, wherein the PATH message carries embedded upstream label ($L_{u2}$), which may indicate the LSP from node 208 to node 202. The PATH message may further specify the bandwidth reservation information needed for upstream traffic. The solid arrow 306 shows the RSVP-TE PATH message transmissions, wherein the PATH messages carry embedded upstream label ($L_{u3}$), which may indicate the LSP from node 206 to node 202. The PATH message may further specify the bandwidth reservation information needed for upstream traffic. The dashed arrow 308 shows the RSVP-TE RESV message transmissions, wherein the RESV message carries embedded downstream label ($L_{d1}$), which may indicate the LSP from node 204 to node 202. The dashed arrow 310 shows the RSVP-TE RESV message transmissions, wherein the RESV message carries embedded downstream label ($L_{d2}$), which may indicate the LSP from node 202 to node 208. The dashed arrow 312 shows the RSVP-TE RESV message transmissions, wherein the RESV message carries embedded downstream label ($L_{d3}$), which may indicate the LSP from node 202 to node 206. At the completion of message transmission, node 202 may have a forwarding table containing each upstream and downstream label for the possible MP2MP RSVP-TE LSPs. Utilizing this embodiment, the complexity of the collective solution as stored in the forwarding table may be linear relative to the number of adjacent nodes, e.g., the path state complexity may be O(n), where n is the number of nodes.

Figure 4:
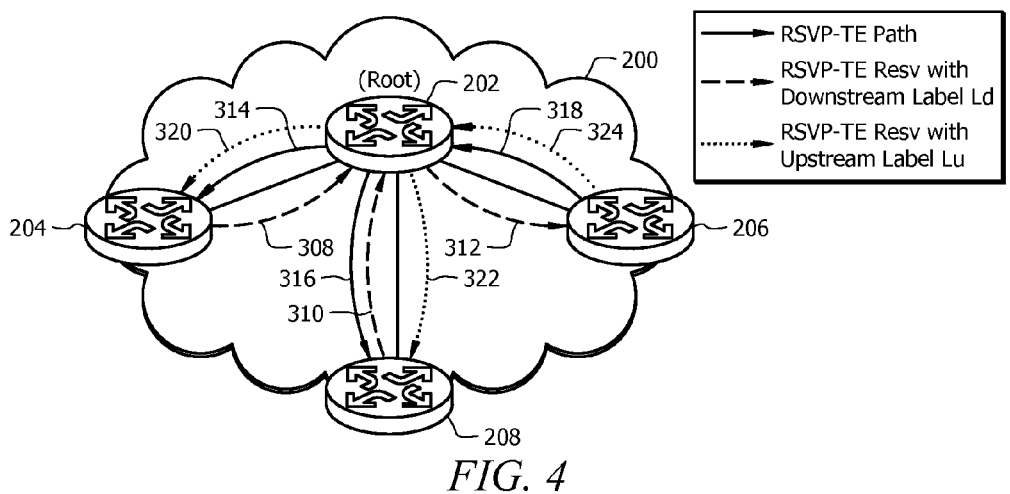
FIG. 4 is a schematic diagram of another embodiment of a MP2MP RSVP-TE solution.

FIG. 4 is a schematic diagram of another embodiment of a MP2MP RSVP-TE solution. FIG. 4 shows the message transmissions necessary to establish the MP2MP RSVP-TE LSP in network 200 under a first embodiment. The solid arrows 314, 316, and 318 show the RSVP-TE PATH messages, which may be conventional PATH messages, e.g., without embedded downstream labels, wherein 314 is the PATH message from node 204 to node 202, 316 is the PATH message from node 202 to node 208, and wherein 318 is a PATH message from node 202 to node 206. As described above, the dashed arrows 308, 310, and 312 show the RSVP-TE RESV message transmissions with embedded downstream labels. Upon receipt of an RESV message with an embedded downstream label, root node 202 may associate the downstream label with the sending node and may advertise an associated upstream label within a reversed RESV message to the relevant downstream node. The reversed RESV message may further specify the bandwidth reservation information within the RESV message, which information may be passed along to the leaf node(s) to reserve the needed bandwidth for upstream traffic from the leaf(s) to the current node. Thus, the dotted arrow 320 shows the RSVP-TE RESV message transmissions, wherein the reverse RESV message carries embedded upstream label ($L_{u1}$), which may indicate the LSP from node 202 to node 202, and which may be in response to RESV message transmission described by dashed arrow 308. The dotted arrow 322 shows the RSVP-TE RESV message transmissions, wherein the RESV message carries embedded upstream label ($L_{u2}$), which may indicate the LSP from node 208 to node 202, and which may be in response to RESV message transmission described by dashed arrow 310. The dotted arrow 324 shows the RSVP-TE RESV message transmissions, wherein the RESV messages carry embedded upstream label ($L_{u3}$), which may indicate the LSP from node 206 to node 202, and which may be in response to RESV message transmission 318. At the completion of message transmission, node 202 may have a forwarding table containing each upstream and downstream label for the possible MP2MP RSVP-TE LSPs. Utilizing this embodiment, the complexity of the collective solution as stored in the forwarding table may be linear relative to the number of adjacent nodes, e.g., the path state complexity may be O(n), where n is the number of nodes.

Figure 5:
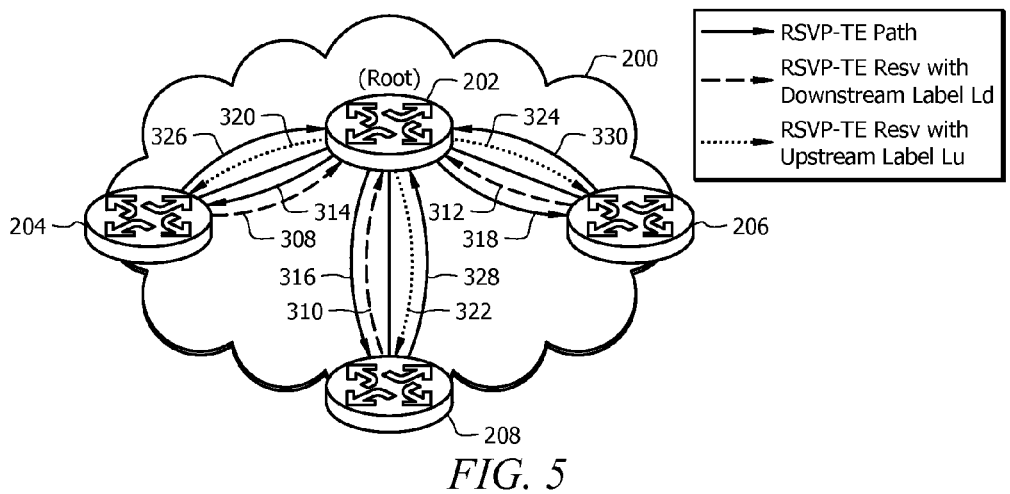
FIG. 5 is a schematic diagram of yet another embodiment of a MP2MP RSVP-TE solution.

FIG. 5 is a schematic diagram of yet another embodiment of a MP2MP RSVP-TE solution. FIG. 5 shows the message transmissions necessary to establish the MP2MP RSVP-TE LSP in network 200 under a first embodiment. Like the solid arrows 314, 316, and 318, solid arrows 326, 328, and 330 show RSVP-TE PATH messages, which may be conventional PATH messages, e.g., without embedded downstream labels, wherein solid arrow 326 depicts the PATH message transmission from node 204 to node 202, solid arrow 328 depicts the PATH message transmission from node 202 to node 208, and wherein solid arrow 330 depicts a PATH message transmission from node 202 to node 206. As described above, the dashed arrows 308, 310, and 312 show the RSVP-TE RESV message transmissions with embedded downstream labels. As described above, the dotted arrows 320, 322, and 324 show the RSVP-TE RESV message transmissions with embedded upstream labels which may be sent in response to the message transmissions described by dashed arrows 308, 310, and 312. In the embodiment of FIG. 5, leaf or transit node(s) may send out RESV messages, e.g., transmission arrows 308, 310, and 312, toward the root node in response to receiving a PATH message, e.g., transmission arrows 314, 316, and 318, respectively. The leaf or transit node(s) may also send out a reversed PATH message, e.g., transmission arrows 326, 328, and 330, to set up an upstream path. Upon receipt of the reversed PATH message(s), the current node may associate an upstream label with the downstream node and advertise the label within a reversed RESV message to the downstream node, e.g., transmission arrows 320, 322, and 324. When the root or the transit node(s) start to send the reversed RESV message, it may further specify the bandwidth reservation information within the RESV message, which information may be passed along to the leaf node(s) to reserve the bandwidth needed for upstream traffic to the current node. At the completion of message transmission, node 202 may have a forwarding table containing each upstream and downstream label for the possible MP2MP RSVP-TE LSPs. Utilizing this embodiment, the complexity of the collective solution as stored in the forwarding table may be linear relative to the number of adjacent nodes, e.g., the path state complexity may be O(n), where n is the number of nodes.

Figure 6:
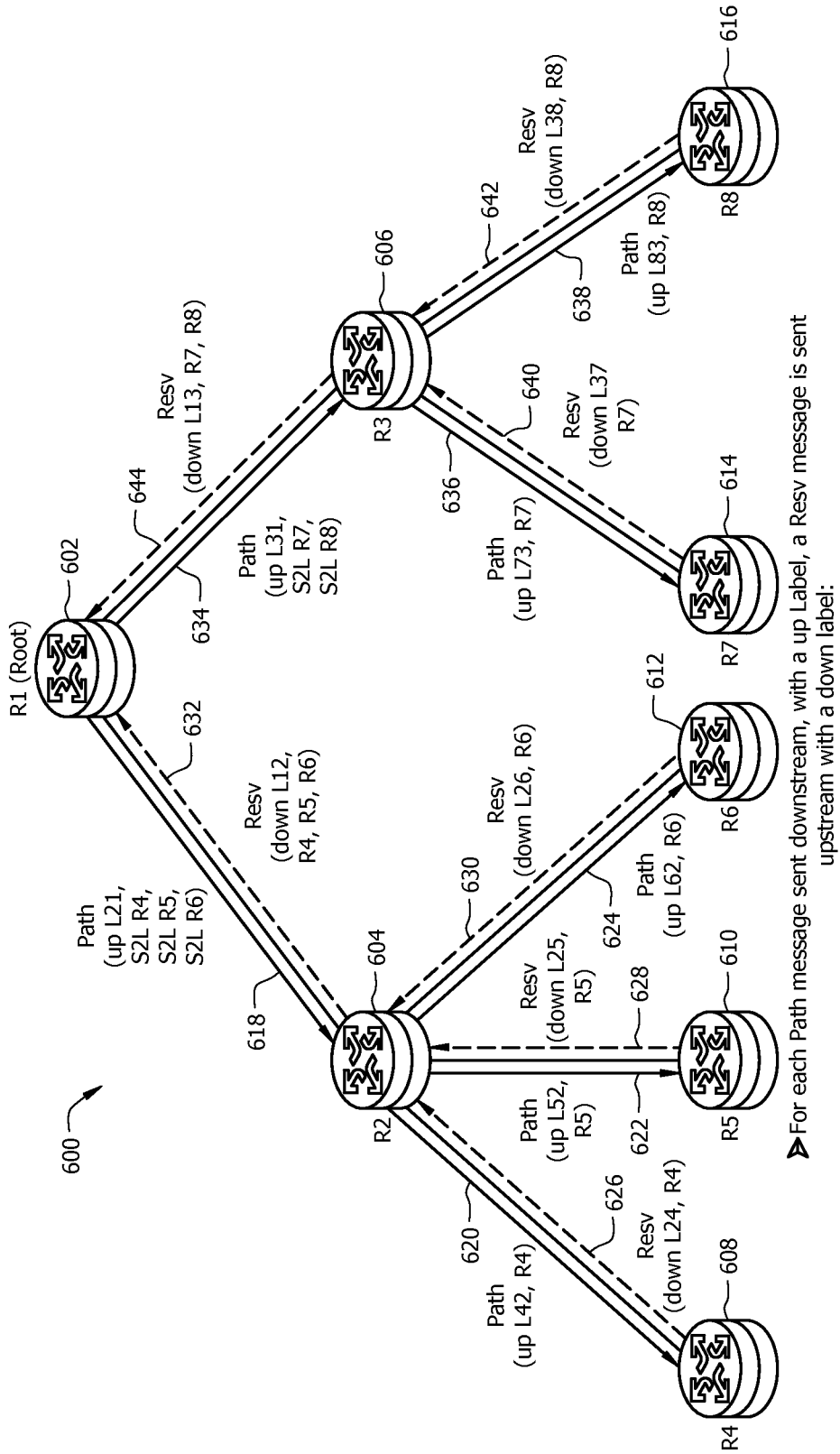
FIG. 6 is a schematic diagram of a network illustrating a signaling protocol for setting the embodiment described in FIG. 3.

FIG. 6 is a schematic diagram of a network 600 illustrating a signaling protocol for setting up an embodiment of an MP2MP LSP solution similar to the embodiment described in FIG. 3 but being two nodes deep. The components of FIG. 6 may be substantially the same as the corresponding components of FIG. 3. Node 602, e.g., node 202, is the root node (labeled R1). Nodes 604 and 606 (labeled R2 and R3, respectively), may be nodes adjacent to the root node 602, e.g., nodes 202, 206, and 208 of FIG. 3. Nodes 608, 610, 612, 614, and 616 (labeled R4, R5, R6, R7, and R8, respectively), may be leaf nodes of network 600, e.g., nodes 202, 206, and 208 of FIG. 3. Solid arrows 618, 620, 622, 624, 634, 636, and 638 represent RSVP-TE PATH messages that encapsulate LSP labels, e.g., the solid arrows of FIG. 3. Dashed arrows 626, 628, 630, 632, 640, 642, and 644 represent transmissions of RSVP-TE RESV messages that encapsulate LSP labels, e.g., the dashed arrows of FIG. 3.

Figure 7:
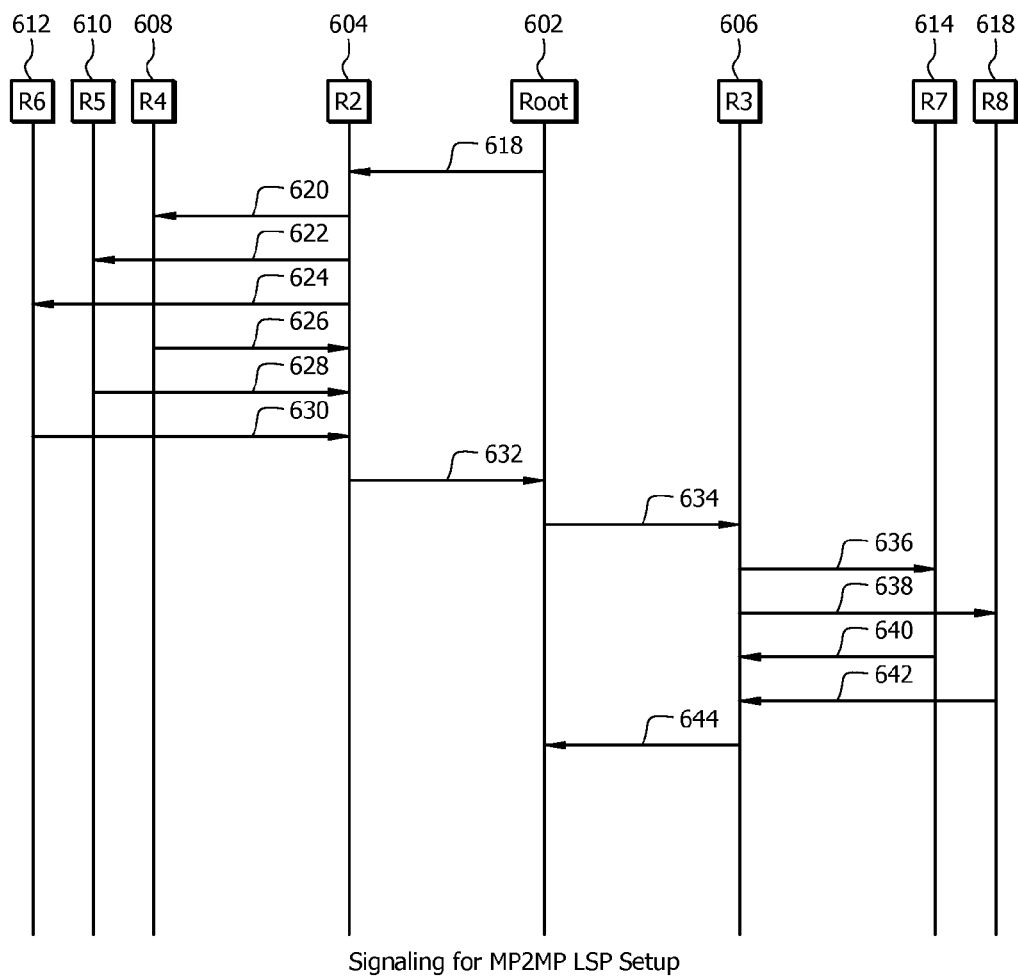
FIG. 7 is a protocol diagram describing the process of signaling for setting up the embodiment depicted in FIG. 6.

FIG. 7 is a process diagram describing the process 700 of signaling for setting up the embodiment of the MP2MP LSP solution depicted in FIG. 6 on the network 600. The process 700 may begin at 618 with R1 transmitting or sending a PATH message encapsulating certain label information, e.g., (upstream label ($L_u$) L21, Source to Leaf (S2L) R4, S2L R5, S2L R6), to its first adjacent node, R2, using a first interface, which label information may be stored in a forwarding table at R1. Node R2 may store the upstream label in a forwarding table upon receipt and may generate and store upstream labels for its adjacent downstream nodes, R4, R5, and R6. At 620, R2 may generate and send to node R4 a PATH message encapsulating certain label information, e.g., ($L_u$ L42, R4). At 622, R2 may generate and send to node R5 a PATH message encapsulating certain label information, e.g., ($L_u$ L52, R5). At 624, R2 may generate and send to node R6 a PATH message encapsulating certain label information, e.g., ($L_u$ L62, R6). For each PATH message sent downstream having an upstream label, a corresponding RESV message may be sent upstream from the destination node having a downstream label ($L_d$). Thus, at 626, R4 may generate and send to node R2 an RESV message encapsulating certain label information, e.g., ($L_d$ L24, R4). At 628, R5 may generate and send to node R2 an RESV message encapsulating certain label information, e.g., ($L_d$ L25, R5). At 630, R4 may generate and send to node R2 an RESV message encapsulating certain label information, e.g., ($L_d$ L26, R6). Node R2 may store the upstream downstream labels in the forwarding table upon receipt. At 632, R2 may respond to the PATH message from R1 with an RESV message encapsulating certain information, e.g., ($L_d$ L12, R4, R5, R6). At 634, R1 may repeat steps 618-632 for a tree branching from a second interface by sending a PATH message encapsulating certain label information, e.g., ($L_u$ L31, S2L R7, S2L R8), to its second adjacent node, R3. Node R3 may store the upstream label information in a forwarding table upon receipt and may generate and store upstream labels for its adjacent downstream nodes, R7 and R8. At 636, R3 may generate and send to node R7 a PATH message encapsulating certain label information, e.g., ($L_u$ L73, R7). At 638, R3 may generate and send to node R8 a PATH message encapsulating certain label information, e.g., ($L_u$ L83, R8). At 640, R7 may generate and send to node R3 an RESV message encapsulating certain label information, e.g., ($L_d$ L37, R7). At 642, R8 may generate and send to node R3 an RESV message encapsulating certain label information, e.g., ($L_d$ L38, R8). Node R3 may store the upstream downstream labels in the forwarding table upon receipt. At 644, R3 may respond to the PATH message from R1 with an RESV message encapsulating certain information, e.g., ($L_d$ L13, R7, R8). Utilizing this embodiment, the complexity of the collective solution as stored in the forwarding tables at R1, R2, and R3 may be linear relative to the number of adjacent nodes, e.g., the path state complexity may be O(n), where n is the number of nodes.

Figure 8:
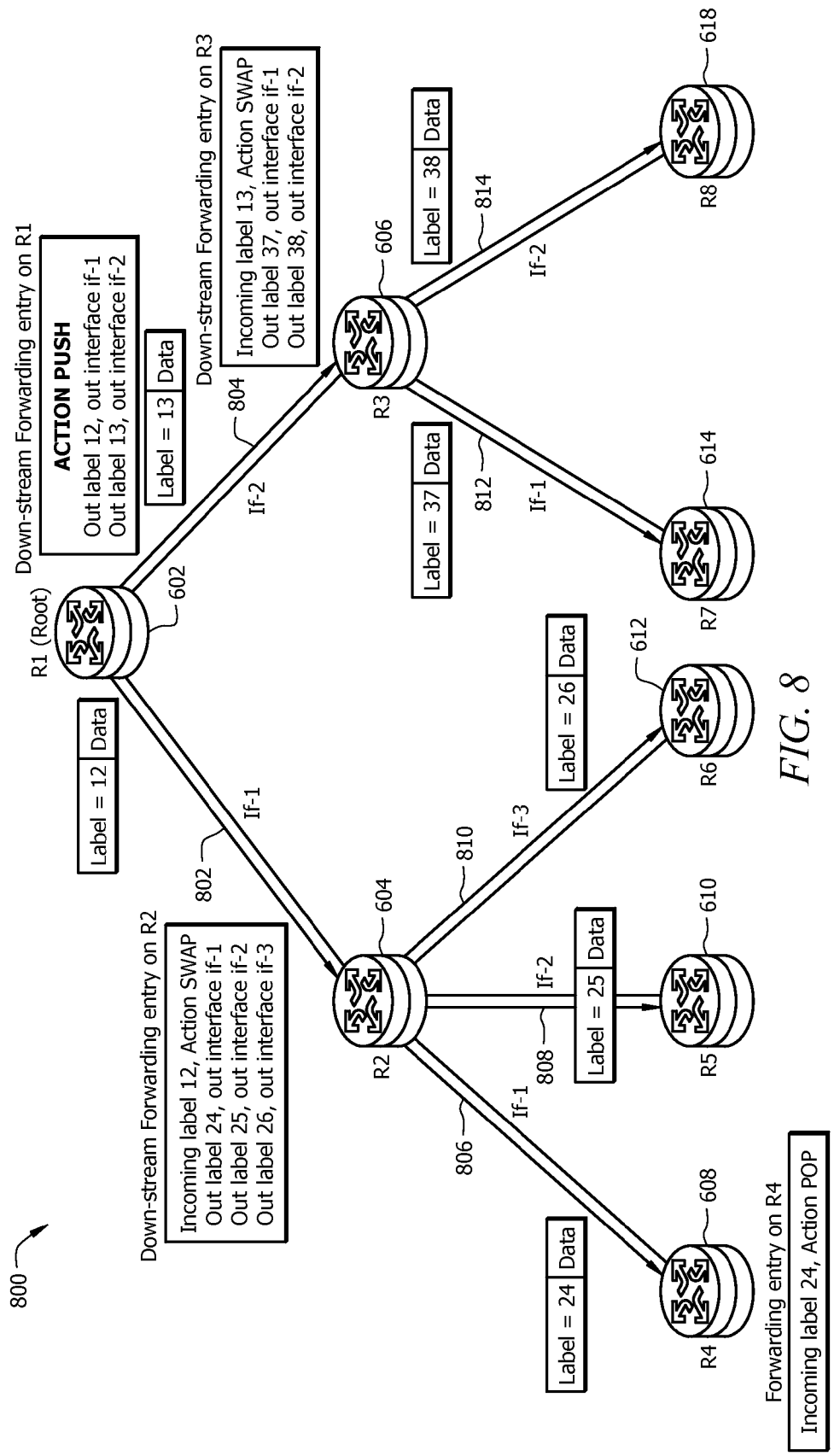
FIG. 8 is a schematic diagram of downstream data forwarding for the embodiment of an MP2MP LSP solution described in FIG. 3.
Figure 10:
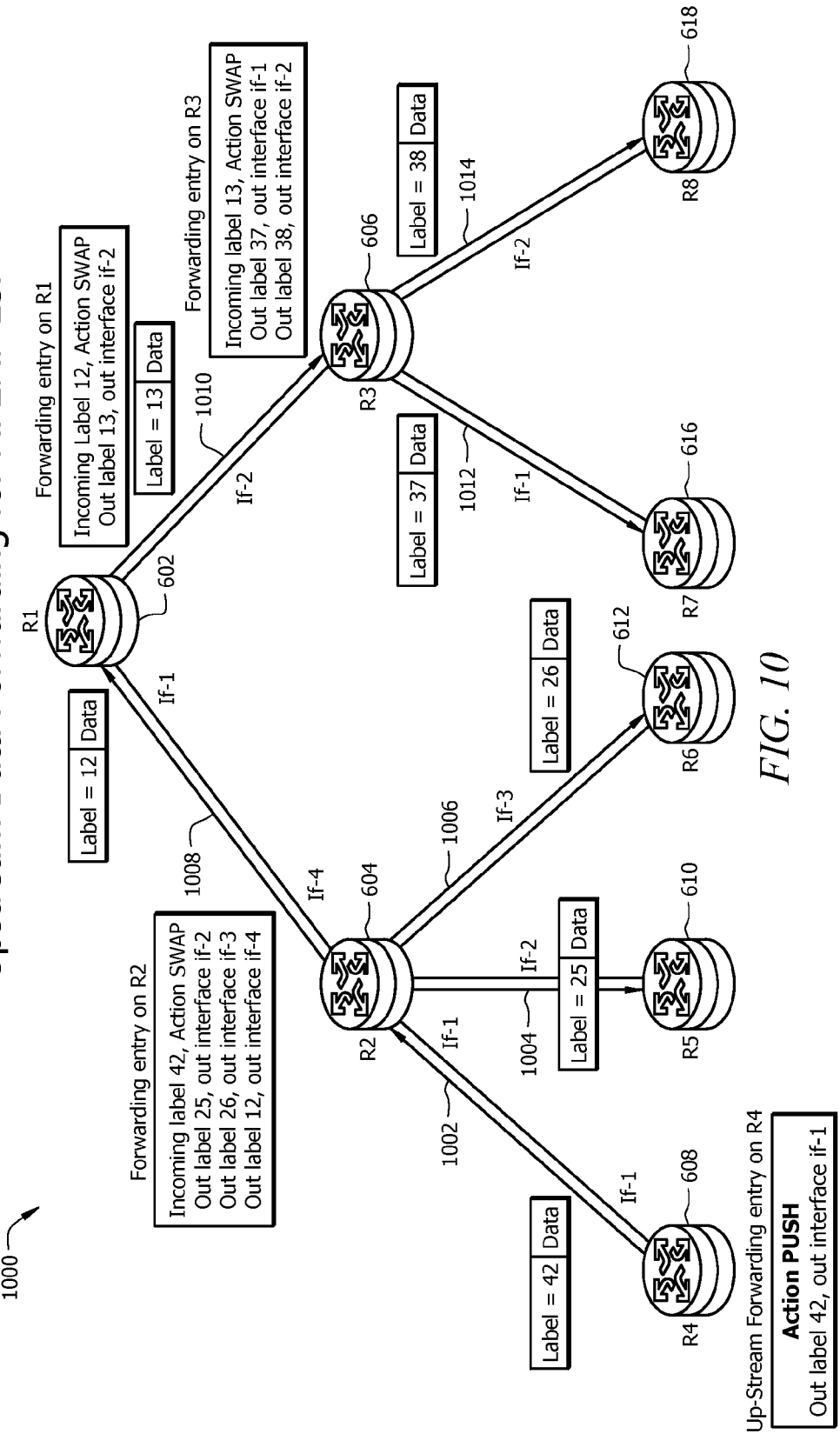
FIG. 10 is a schematic diagram of upstream data forwarding for the embodiment of an MP2MP LSP solution described in FIG. 3.

FIG. 8 is a schematic diagram of downstream data forwarding for an embodiment of an MP2MP LSP solution on a network 800 similar to the embodiment described in FIG. 3 but being two nodes deep. FIG. 8 shows downstream data forwarding beginning with the root node R1, passing to adjacent downstream nodes R2 and R3 along paths 802 and 804, and continuing to leaf nodes R4, R5, R6, R7, and R8 along paths 806, 808, 810, 812, and 814, respectively (the upstream embodiment is shown in FIG. 10). Data forwarded downstream on network 800 may include conventional MP2MP LSP data traffic, and the data may be forwarded across network 800 as described further herein.

Figure 9:
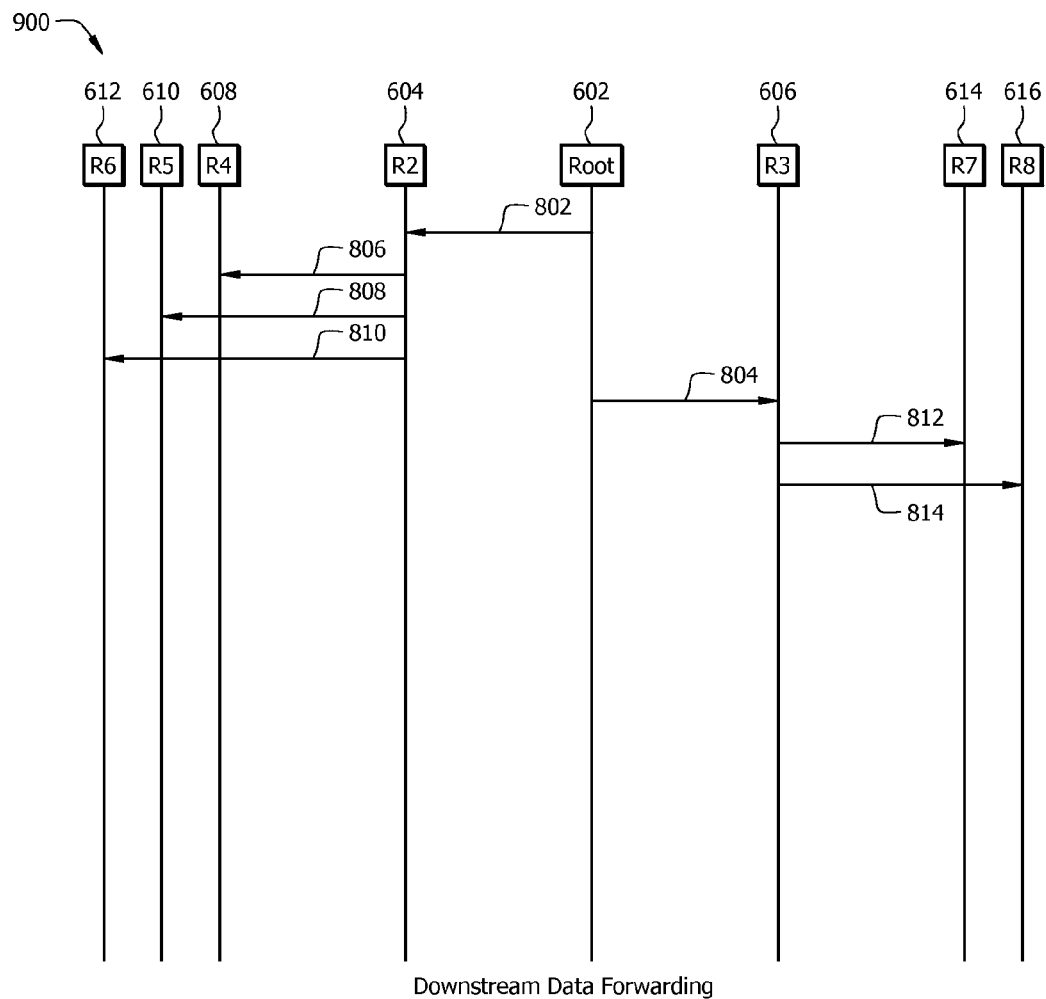
FIG. 9 is a protocol diagram describing the process of downstream data forwarding depicted in FIG. 8.

FIG. 9 is a process diagram describing the process 900 of downstream data forwarding depicted in FIG. 8. At 802, data carrying an upstream label, e.g., $L_u$ L12, may be sent from R1 to R2 using interface 1. Upon receipt, R2 may look up the label in an upstream forwarding entry on the forwarding table of R2, and may swap the upstream label for labels suitable for the leaf nodes of R2. Thus, at 806 R2 may swap $L_u$ L12 for $L_u$ L24 and send R4 data using interface 1. Similarly, at 808 R2 may swap $L_u$ L12 for $L_u$ L25 and send R5 data using interface 2, and at 810 R2 may swap $L_u$ L12 for $L_u$ L26 and send R6 data using interface 3. Similarly, at 804 data carrying an upstream label, e.g., $L_u$ L13, may be sent from R1 to R3 using interface 2. Upon receipt, R3 may look up the label in an upstream forwarding entry on the forwarding table of R3, and may swap the upstream label for labels suitable for the leaf nodes of R3. Thus, at 812 R3 may swap $L_u$ L12 for $L_u$ L37 and send R7 data using interface 1, and at 814 R3 may swap $L_u$ L13 for $L_u$ L38 and send R8 data using interface 2.

FIG. 10 is a schematic diagram of upstream data forwarding for an embodiment of an MP2MP LSP solution on a network 1000 similar to the embodiment described in FIG. 3 but being two nodes deep. FIG. 10 shows upstream data forwarding beginning with the leaf node R4, passing to adjacent upstream node R2 at 1002, and from R2 along paths 1004, 1006, and 1008 to nodes R5, R6, and R1, respectively. At 1010, R1 forwards data to adjacent node R3, which is forwarded to leaf nodes R7 and R8 at 1012 and 1014, respectively. Data forwarded upstream on network 1000 may include conventional MP2MP LSP data traffic, and the data may be forwarded across network 900 as described further herein.

Figure 11:
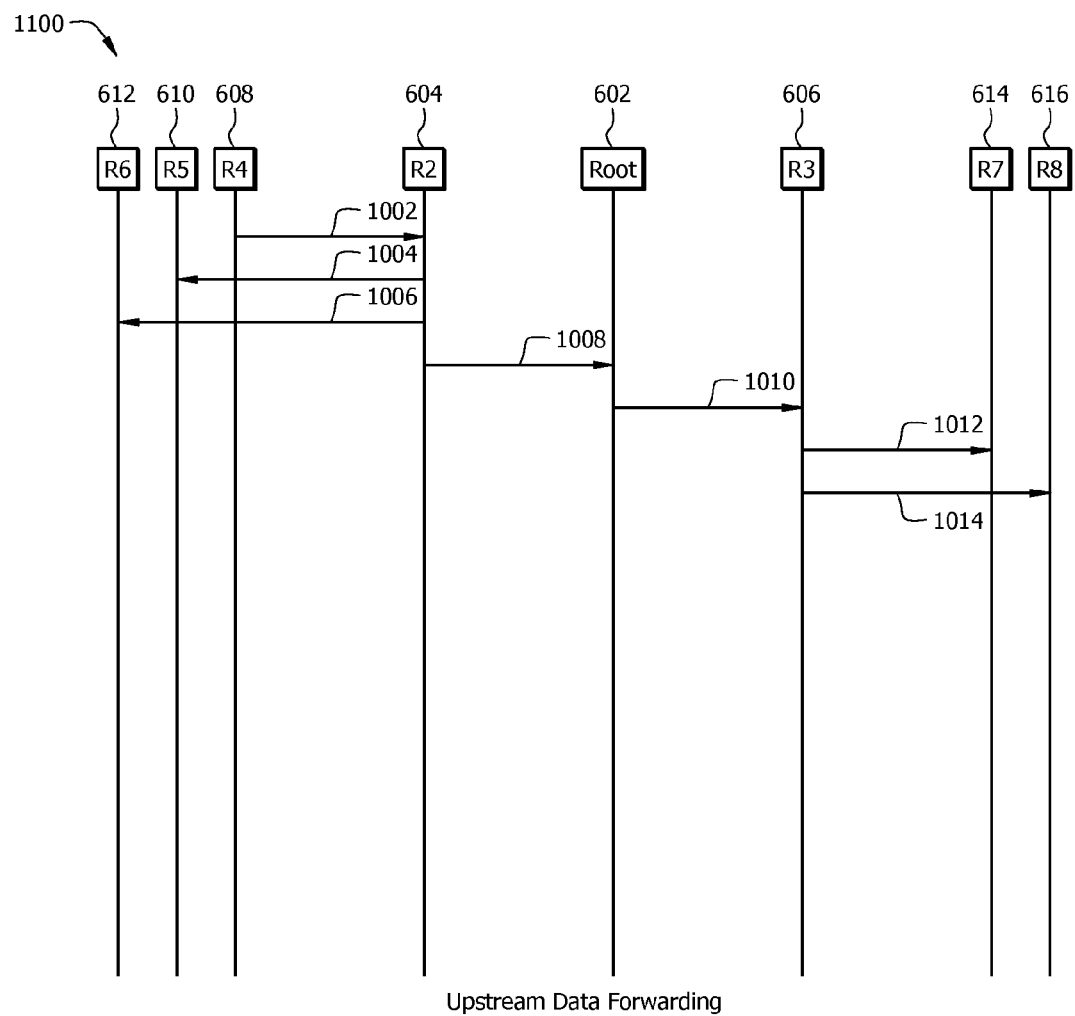
FIG. 11 is a protocol diagram describing the process of upstream data forwarding depicted in FIG. 10.

FIG. 11 is a process diagram describing the process 1100 of upstream data forwarding depicted in FIG. 10. At 1002, data carrying an downstream label, e.g., $L_d$ L42, may be sent from R4 to R2. R2 may receive the data on interface 1, and may, upon receipt, look up the label in an downstream forwarding entry on the forwarding table of R2. R2 may swap the downstream label according to the forwarding table of R2. Thus, at 1004 R2 may swap $L_d$ L42 for $L_d$ L25 and send R5 data using interface 2. Similarly, at 1006 R2 may swap $L_d$ L42 for $L_d$ L26 and send R6 data using interface 3, and at 1008 R2 may swap $L_d$ L42 for $L_d$ L12 and send R1 data using interface 4. Upon receipt, R1 may look up the label in a downstream forwarding entry on the forwarding table of R1. R1 may swap the downstream label according to the forwarding table of R1. At 1010, data with the downstream label $L_d$ L13 may be sent from R1 to R3 using interface 2. Upon receipt, R3 may look up the label a downstream forwarding entry on the forwarding table of R3, and may swap the downstream label for labels suitable for the leaf nodes of R3. Thus, at 1012, R3 may swap $L_d$ L13 for $L_d$ L37 and send R7 data using interface 1, and at 1014 R3 may swap $L_d$ L13 for $L_d$ L38 and send R8 data using interface 2.

Figure 12:
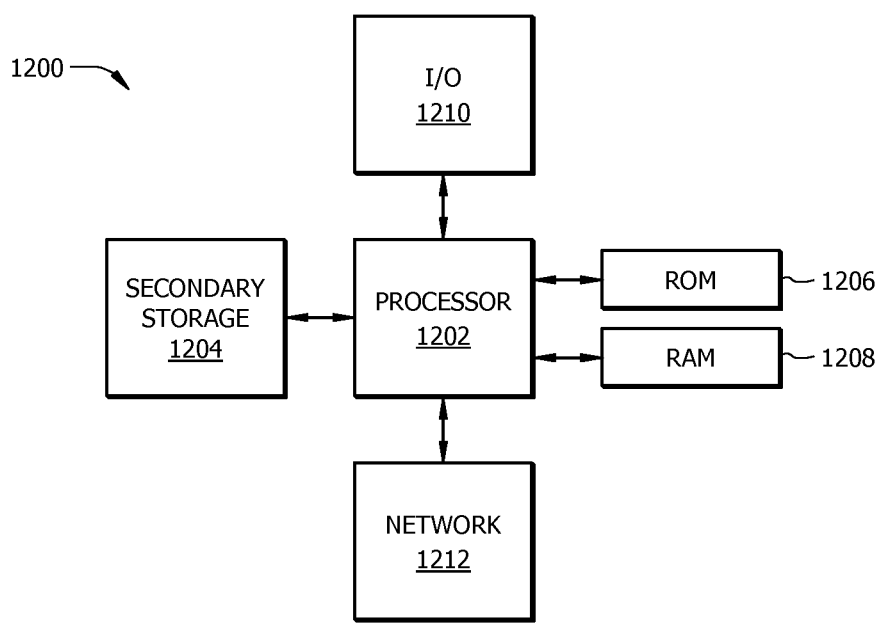
FIG. 12 is a schematic diagram of an embodiment of a typical, general-purpose network component.

At least some of the features/methods described in the disclosure may be implemented in a general computing device and/or a network apparatus or component, such as a computer or network component with sufficient processing power, memory resources, and network throughput capability to handle the necessary workload placed upon it. For instance, the features/methods of the disclosure may be implemented using hardware, firmware, and/or software installed to run on hardware. FIG. 12 is a schematic diagram of an embodiment of a typical, general-purpose network component 1200 suitable for implementing one or more embodiments of the components disclosed herein. The network component 1200 includes a processor 1202 (which may be referred to as a central processor unit or CPU) that is in communication with memory devices including secondary storage 1204, read only memory (ROM) 1206, random access memory (RAM) 1208, input/output (I/O) devices 1210, e.g., cameras, microphones, display screens, etc., and network connectivity devices 1212. The processor 1202 may be implemented as one or more CPU chips, or may be part of one or more application specific integrated circuits (ASICs) and/or digital signal processors (DSPs).

The secondary storage 1204 is typically comprised of one or more disk drives or erasable programmable ROM (EPROM) and is used for non-volatile storage of data. Secondary storage 1204 may be used to store programs that are loaded into RAM 1208 when such programs are selected for execution. The ROM 1206 is used to store instructions and perhaps data that are read during program execution. ROM 1206 is a non-volatile memory device that typically has a small memory capacity relative to the larger memory capacity of secondary storage 1204. The RAM 1208 is used to store volatile data and perhaps to store instructions. Access to both ROM 1206 and RAM 1208 is typically faster than to secondary storage 1204.

It is understood that by programming and/or loading executable instructions onto the general computing device 1200, at least one of the processor 1202, the ROM 1206, and the RAM 1208 are changed, transforming the general computing device 1200 in part into a particular machine or apparatus, e.g., a video codec, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a processor configured to:
store a first upstream label in a forwarding table upon receipt of a first message encapsulating the first upstream label from a first adjacent node;
store a first downstream label in the forwarding table upon receipt of a second message encapsulating the first downstream label from a second adjacent node;
send a third message encapsulating a second downstream label to the first adjacent node;
send a fourth message encapsulating a second upstream label to the second adjacent node; and
forward data received from a plurality of adjacent nodes over a multipoint-to-multipoint (MP2MP) Label Switched Path (LSP) using at least a portion of the labels stored in the forwarding table, wherein each adjacent node is associated with only one upstream label and only one downstream label, and wherein the maximum state complexity of the forwarding table is linear relative to the number of adjacent nodes,
wherein the first and fourth messages are Resource Reservation Protocol-Traffic Engineering (RSVP-TE) PATH messages, and
wherein the second and third messages are RSVP-TE reservation (RESV) messages.

2. The apparatus of claim 1, wherein forwarding data comprises:
receiving a fifth message having the first downstream label from the second adjacent node;
swapping the first downstream label for the first upstream label; and
sending the fifth message having the first upstream label to the first adjacent node.

3. An apparatus comprising:
a processor configured to:
store a first upstream label in a forwarding table upon receipt of a first message encapsulating the first upstream label from a first adjacent node;
store a first downstream label in the forwarding table upon receipt of a second message encapsulating the first downstream label from a second adjacent node;
send a third message encapsulating a second downstream label to the first adjacent node;
send a fourth message encapsulating a second upstream label to the second adjacent node; and
forward data received from a plurality of adjacent nodes over a multipoint-to-multipoint (MP2MP) Label Switched Path (LSP) using at least a portion of the labels stored in the forwarding table, wherein each adjacent node is associated with only one upstream label and only one downstream label, and wherein the maximum state complexity of the forwarding table is linear relative to the number of adjacent nodes;
receive a fifth message from the first adjacent node; and
send a sixth message to the second adjacent node,
wherein the first, second, third, and fourth messages are Resource Reservation Protocol-Traffic Engineering (RSVP-TE) reservation (RESV) messages, and
wherein the fifth and sixth messages are RSVP-TE PATH messages.

4. The apparatus of claim 3, wherein the processor is further configured to send the fourth message to the first adjacent node in response to the first message.

5. The apparatus of claim 3, wherein the processor is further configured to:
send a seventh message to the first adjacent node; and
send an eight message to the second adjacent node, and
wherein the seventh and eighth messages are RSVP-TE PATH messages.

6. The apparatus of claim 5, wherein the third message is sent in response to the first message, and wherein the second message is sent in response to the fourth message.

7. A computer program product comprising computer executable instructions stored on a non-transitory medium that when executed by a processor cause the processor to perform the following:
receive, at a first interface of a node, a first message having a first upstream label, wherein the first upstream label identifies the upstream sender in a multipoint-to-multipoint (MP2MP) label switched path (LSP);
store the first upstream label in a forwarding table;
send, at a second interface of the node, a second message having a second upstream label to a downstream node, wherein the second upstream label identifies the node as an upstream node of the MP2MP LSP;
receive, at the second interface of the node, a third message having a first downstream label from the downstream node, wherein the downstream label identifies the downstream node as a downstream root node of the MP2MP LSP;
store the first downstream label in the forwarding table; and
send, at the first interface of the node, a fourth message having a second downstream label to the upstream sender, wherein the second downstream label identifies the node as a downstream node of the MP2MP LSP, wherein the maximum state complexity of the forwarding table is linear with respect to any number of adjacent nodes, wherein the first and second messages are Resource Reservation Protocol-Traffic Engineering (RSVP-TE) PATH messages, and wherein the third and fourth messages are RSVP-TE reservation (RESV) messages.

8. The computer program product of claim 7, wherein the first and second messages comprise bandwidth reservation information necessary to reserve suitable bandwidth for upstream traffic from a leaf node accessible from the second interface to a root node accessible from the first interface.

9. A computer program product comprising computer executable instructions stored on a non-transitory medium that when executed by a processor cause the processor to perform the following:

receive, at a first interface of a node, a first message having a first upstream label, wherein the first upstream label identifies the upstream sender in a multipoint-to-multipoint (MP2MP) label switched path (LSP);

store the first upstream label in a forwarding table;

send, at a second interface of the node, a second message having a second upstream label to a downstream node, wherein the second upstream label identifies the node as an upstream node of the MP2MP LSP;

receive, at the second interface of the node, a third message having a first downstream label from the downstream node, wherein the downstream label identifies the downstream node as a downstream root node of the MP2MP LSP;

store the first downstream label in the forwarding table; and send, at the first interface of the node, a fourth message having a second downstream label to the upstream sender, wherein the second downstream label identifies the node as a downstream node of the MP2MP LSP, receive, at the first interface of the node, a first Resource Reservation Protocol-Traffic Engineering (RSVP-TE) PATH message; and send, at the second interface of the node, a second RSVP-TE PATH message, wherein the first, second, third, and fourth messages are RSVP-TE reservation (RESV) messages, and wherein the maximum state complexity of the forwarding table is linear with respect to any number of adjacent nodes.

10. The computer program product of claim 9, wherein the instructions further cause the processor to perform the following:

receive, at the second interface of the node, a third RSVP-TE PATH message; and send, at the first interface of the node, a fourth RSVP-TE PATH message.

11. The computer program product of claim 10, wherein the third and fourth RSVP-TE PATH messages comprise bandwidth reservation information necessary to reserve suitable bandwidth for upstream traffic from a leaf node accessible from the second interface to a root node accessible from the first interface.

12. The computer program product of claim 9, wherein the first and second messages comprise bandwidth reservation information necessary to reserve suitable bandwidth for upstream traffic from a leaf node accessible from the second interface to a root node accessible from the first interface.

* * * * *

UNITED STATES PATENT AND TRADEMARK OFFICE
CERTIFICATE OF CORRECTION

PATENT NO. : 9,137,159 B2
APPLICATION NO. : 13/850739
DATED : September 15, 2015
INVENTOR(S) : Qianglin Quintin Zhao and Ying Chen It is certified that error appears in the above-identified patent and that said Letters Patent is hereby corrected as shown below:

In the Claims

Column 12, Line 38, Claim 5 should read:

The apparatus of claim 3, wherein the processor is further configured to:
send a seventh message to the first adjacent node;
send an eight message to the second adjacent node, and
wherein the seventh and eighth messages are RSVP-TE PATH messages.

Signed and Sealed this
Fifth Day of July, 2016

Michelle K. Lee
*Director of the United States Patent and Trademark Office*